United States Patent [19]
Lindblad

[11] 3,779,479
[45] Dec. 18, 1973

[54] LOCKING DEVICE FOR A WINDING UP SAFETY BELT FOR VEHICLES

[76] Inventor: Stig Martin Lindblad, 440 20, Vargarda, Sweden

[22] Filed: Nov. 8, 1971

[21] Appl. No.: 196,493

[52] U.S. Cl. .............................. 242/107.4, 188/135
[51] Int. Cl. ...................... A62b 35/00, B65h 63/04
[58] Field of Search ........................... 280/150 SB; 242/107.4, 107.3, 107 SB; 297/384, 385, 297/388; 188/135

[56] References Cited
UNITED STATES PATENTS
3,240,510    3/1966    Spouge .......................... 242/107.4

Primary Examiner—Stanley N. Gilreath
Assistant Examiner—Jon W. Henry
Attorney—William C. Linton et al.

[57] ABSTRACT

A locking device for vehicle safety belts of the wind-up type having one part of the safety belt wound onto a roller from which it may be unwound against the action of a spring and which locking device includes a brake element connected to said roller for rotation therewith, levers engageable with said brake element and inertia elements provided with said arms whereby when the vehicle is subjected to a rapid acceleration said inertia elements cause said levers to engage said brake element whereupon said roller is prevented from rotating in the belt winding off direction.

4 Claims, 2 Drawing Figures

PATENTED DEC 18 1973

3,779,479

LOCKING DEVICE FOR A WINDING UP SAFETY BELT FOR VEHICLES

The present invention relates to safety belts of the winding up type wherein the belt is adapted to be wound off from a rotatable roller against the action of a spring. More specifically the invention is for a locking device for a belt of this type.

The main object of the invention is to provide a device of the kind set forth above which is of simple construction and reliable in use.

The invention is substantially characterized in that the locking device comprises a brake element rotating together with the roller, said brake element having an annular toothing concentric with the axis of rotation and at least one double armed lever pivoted on a substantially vertical axis, one arm of said lever being adapted to cooperate with said toothing, the second arm of said lever being provided with an inertia element which, upon the vehicle being subjected to a rapid acceleration in one direction or another, will cause said lever to pivot in such a fashion that the lever arm cooperating with the toothing will be swung from a neutral position in which it is out of engagement with the toothing to an operative position in which it is in engagement with the toothing, whereby the brake element and thereby also said winding up roller will be prevented from rotating further in the winding off direction.

Figure 1:
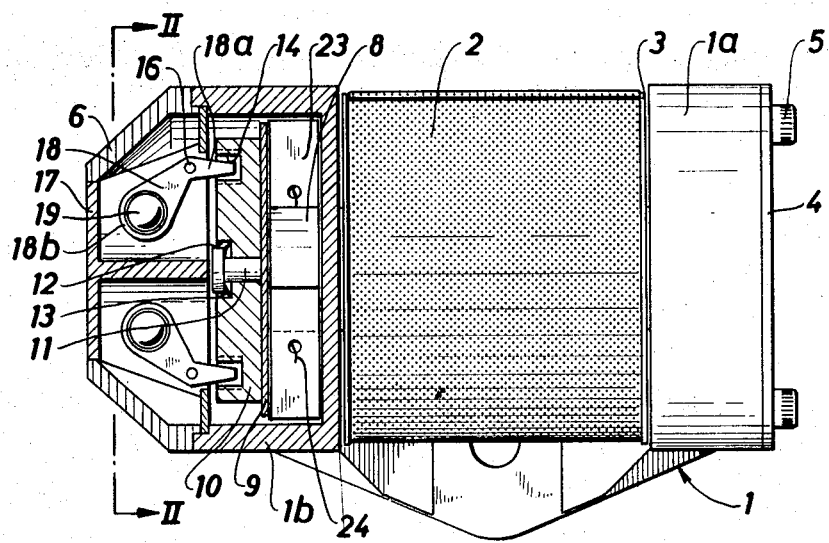
Figure 2:
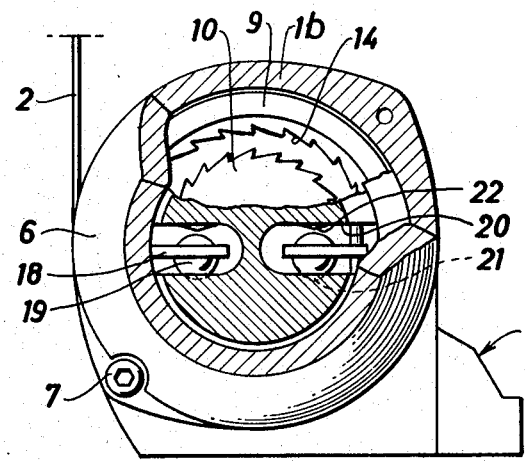

One embodiment of the invention will be described herebelow with reference to the accompanying drawing, wherein FIG. 1 is a view from above of a winding up device provided with a locking device according to the invention, that portion of the winding up device which comprises the locking device being shown in section, and FIG. 2 is a section taken on the line II—II in FIG. 1.

In the drawing the winding up device is indicated as a whole at 1, and numeral 2 indicates a portion of a safety belting wound up on a winding up roller 3. The winding up roller 3 is rotatably journalled on a central shaft against the action of a helical spring or the like, not shown in the drawing. In the embodiment shown the helical spring is mounted in a housing 1a disposed to one side of the roller 3 and covered by a lid 4 which is secured to the housing by means of screws 5. To the other side of the roller 3 there is provided a second housing 1b which is closed by a lid 6 secured to the housing 1b by means of screws 7. A pin or stud shaft 8 rotating together with the roller 3 projects into the housing 1b. To the pin 8 there is attached a disc 9 against which lies a disc shaped brake element 10 which is maintained in position by means of a central pin 11 attached to disc 9. The head of the pin 11 is partly received in a central bore 12 in the brake element 10. The pressure is transmitted from the head of the pin 11 to the friction element 10 by means of a spring washer 13. In that side of the inertia element which faces away from the roller there is provided a circular groove 14 which is concentric with the rotational axis of the roller 3 and which is made with toothed side walls. In the space formed by the lid 6 there is provided an element 17 carrying two double armed levers 18 each pivoted on a vertical shaft 16. Each lever 18 has one arm 18a extending into the groove of the brake element 10 and the second arm 18b surrounds an inertia balls 19 disposed in a bore in said lever arm. As will be clear from FIG. 2, the lever arms and the corresponding inertia balls are located in horizontal cut outs 20 in the element 17. It also appears from FIG. 2 that the levers 18 are plate shaped. The cut outs 20 are each provided with a recess indicated in broken lines in FIG. 2, the balls being located in said recesses when the locking device is in its position of rest. Above each recess 21 there is provided a projection 22 in the upper side walls of the cut outs 20. The element 17 may be rotated for the purpose of mounting the winding up device in some other position than that shown in FIG. 2.

The locking device operates in the following manner: Upon a rapid acceleration acting on the vehicle in its longitudinal or transverse direction the inertia balls 19 will move from their position of rest which results in a pivoting of the lever 18 around its shaft 16, so that the lever arm 18a will be moved into engagement with the toothing in one side wall of the groove 14. Due to the saw tooth form of the teeth the lever arms 18a will abut the leading edges of the teeth and will thus prevent further rotation of the brake element 10 in the direction of the arrow. When the brake element 10 is very rapidly braked it will slide relative to the disc 9 thereby eliminating the risk for shaft breakage or the like. Should the vehicle turn over and come to a position upside down the balls 19 will rest on top of the projections 22. This is obviously a very unstable position and the balls will roll down from the projections causing the locking lever to be moved to locking position as described above.

The locking device described hereabove will be moved to locking position when the vehicle is subjected to a rapid acceleration in any direction but it will not be actuated by rapid acceleration of the roller 3 in the winding off direction. For this purpose the winding up device may be provided with a further locking device. One embodiment of such a locking device which is suitable for combination with the locking device described hereinbefore is shown in the drawing. The device comprises a plate shaped locking member 23 located in V-shaped axial grooves in the pin 8. The locking members are pressed with one edge towards the bottom of the V-shaped grooves by means of a draw spring 24 which extends between two locking members 23 arranged on opposite sides of the pin 8 through a bore not shown in the drawing.

An inertia element (not shown) is freely rotatable around the pin 8 and is provided with openings through which the locking elements 23 extend towards the cylindrical inner wall of the housing 1b. The inclination of the walls of the V-shaped grooves and the length of the locking elements 23 are such that in the position of rest the locking elements are slightly spaced from the cylindrical wall of the housing 1b, whereas in the operative position the locking elements engage the wall of the housing. The locking elements are maintained in their position of rest when the roller 3 is at rest or rotates without rapid acceleration in the winding up direction which is indicated by the arrow in FIG. 2. If, however, a heavy pull in the belt part 2 should cause the roll 3 and the pin 8 to accelerate rapidly, the inertial force excerted upon the locking members 23 will exceed the force exerted by the spring 24, so that the locking elements will be pivoted to the position in which they engage the inner wall of the housing 1b, so that the pin 8 and thereby the winding up roll 3 will be prevented from rotating further. Consequently, further winding off of the belt 2 will not be possible.

The invention is not limited to the embodiment described hereinbefore and shown in the drawing as an example only, said embodiment being capable of modifications with respect to its details without departing from the scope of the appended claims. For instance, it is not necessary that the groove 14 has the shape illustrated in the drawing, since it can be formed in any other suitable manner. It is also within the scope of the invention to provide the groove with toothing only in the bottom or in one of the side walls.

I claim:

1. A locking device for vehicle safety belts of the windup type comprising a roller mounted on a horizontal shaft, a safety belt wound on said roller, resilient means tending to retain said roller from rotating under the unwinding of said belt, a brake element connected to said roller for rotation therewith, said brake element having annular teeth concentric with the axis of rotation of said brake element, at least one double armed lever pivotally mounted on a vertical shaft, one arm of said lever being capable of engaging said teeth, the second arm of said lever having an opening, a ball extending through said second arm opening, a fixed support having a slot defined by walls of said support and having said ball positioned between said walls, said vertical shaft extending between said walls, one of said slot walls having a recess with said ball normally extending therein in the inoperative position of said lever whereby during normal use of a vehicle having the present device mounted therein, said ball tends to move away from said position due to its inertia upon rapid changes in the velocity of the vehicle in any direction with said ball moving said first arm of said lever into engagement with said teeth preventing rotation of said brake element and the unwinding of said safety belt.

2. A locking device for vehicle safety belts as claimed in claim 1 wherein said slot is horizontally positioned.

3. A locking device for vehicle safety belts as claimed in claim 2 wherein a projection is provided on the other of said slot walls opposite said recess whereby said ball will rest on said projection if the vehicle turns over and then roll from said projection causing said lever to move to said teeth engaging position.

4. A locking device for vehicle safety belts of the wind-up type comprising a roller mounted on a horizontal shaft, a safety belt wound on said roller, resilient means tending to retain said roller from rotating upon the unwinding of said belt, a brake element connected to said roller for rotation therewith, said brake element having an annular open groove with teeth on the side walls defining said groove concentric with the axis of rotation of said brake element, a fixed support having a mounting portion including a horizontal wall, said wall having a recess, a vertical shaft mounted on said wall, at least one double armed lever pivotally mounted on said vertical shaft, one arm of said lever extending into said groove and positioned for at times engaging said teeth, the second of said arms having an opening adjacent said recess, and an inertia element positioned through said opening, whereby said inertia element normally extends into said recess and upon the vehicle being subjected to a rapid acceleration said inertia element will move to pivot said one arm into engagement with said teeth preventing said brake element from rotating in its belt unwinding direction.

* * * * *